United States Patent [19]

Kawasaki et al.

[11] Patent Number: 4,551,351

[45] Date of Patent: Nov. 5, 1985

[54] PROCESS FOR PRODUCING MEAT BLOCK-LIKE PROTEIN MATERIAL

[75] Inventors: Yoichi Kawasaki, Sennan; Tsutomu Katayama, Izumisano, both of Japan

[73] Assignee: Fuji Oil Company, Limited, Osaka, Japan

[21] Appl. No.: 578,757

[22] Filed: Feb. 9, 1984

[51] Int. Cl.[4] ................................................ A23J 3/00
[52] U.S. Cl. .................................... 426/656; 426/657; 426/512; 426/802
[58] Field of Search ............... 426/104, 656, 802, 512, 426/657

[56] References Cited

U.S. PATENT DOCUMENTS

| | | | |
|---|---|---|---|
| 3,950,564 | 4/1976 | Puski et al. | 426/802 X |
| 3,968,268 | 7/1976 | Sair et al. | 426/802 X |
| 4,017,646 | 4/1977 | Hoer et al. | 426/802 X |
| 4,166,138 | 8/1979 | Ziminski et al. | 426/802 X |
| 4,216,240 | 8/1980 | Shirai et al. | 426/802 X |

*Primary Examiner*—Robert Yoncoskie
*Attorney, Agent, or Firm*—Wenderoth, Lind & Ponack

[57] ABSTRACT

A process for producing a meat block-like protein material which comprises preparing a slurry containing a raw protein material, heating the slurry under pressure to force the slurry to flow through a flow path, and continuously releasing the flowing slurry from the downstream end of the flow path into a hollow piece connected to the flow path at one end of the hollow piece and having an inner surface extending across the releasing direction of the slurry and an outlet opening provided at the other end of the hollow piece thereby forming a fibrous protein material and allowing the fibrous material to accumulate and coagulate on the inner surface to form a block or lump of the fibrous protein material so that it continuously or intermittently discharges from the hollow piece through its outlet opening to give the meat block-like protein material.

10 Claims, 11 Drawing Figures

PROCESS FOR PRODUCING MEAT BLOCK-LIKE PROTEIN MATERIAL

The present invention relates to a process for producing a meat block-like protein material. More particularly, it relates to a process for producing an edible imitation meat in the shape of a block or lump of fibrous protein.

BACKGROUND OF THE INVENTION

Various attempts to produce edible meat substitutes from protein sources other than meat have been hitherto made and fibrous protein and other protein materials having texture or structure have been produced. In general, these protein materials are primarily obtained in the shape of granules, flakes, fibers, sheet, etc. and, in order to obtain meat block-like materials, they are further processed separately by using binders and the like.

Attempts to directly produce meat block-like protein materials from raw protein materials by a single continuous process have been also made. For example, Japanese Patent Publication No. 7217/1980 discloses the production of a meat-like material from a slurry of a raw protein material having a relatively low water content (25 to 65 % by weight) by using an injection machine to inject the slurry into a metal mold. U.S. Pat. No. 4,197,327 discloses the production of a meat-like block or lump of protein fibers by accumulating a coagulable protein slurry under water-drainable conditions.

The present inventors have surprisingly found that a meat block-like protein material can be readily and continuously obtained from a raw protein material by continuously releasing a slurry containing the raw protein material flowing through a flow path into a specific hollow piece.

SUMMARY OF THE INVENTION

The main object of the present invention is to provide an improved single continuous process for producing a meat block-like protein material.

This object as well as other objects and advantages of the present invention will be apparent to those skilled in the art from the following description.

According to the present invention, there is provided a process for producing a meat block-like protein material which comprises preparing a slurry containing a raw protein material, heating the slurry under pressure to force the slurry to flow through a flow path, and continuously releasing the flowing slurry from the downstream end of the flow path into a hollow piece connected to the flow path at one end of the hollow piece and having an inner surface extending across the releasing direction of the slurry and an outlet opening provided at the other end of the hollow piece thereby forming a fibrous protein material and allowing the fibrous material to accumulate and coagulate on the inner surface to form a block or lump of the fibrous protein material so that it continuously or intermittently discharges from the hollow piece through its outlet opening to give the meat block-like protein material. The term "meat block-like protein material" used herein means an edible imitation meat product in the shape of a block or lump of fibrous protein.

DETAILED DESCRIPTION OF THE INVENTION

Figure 1:
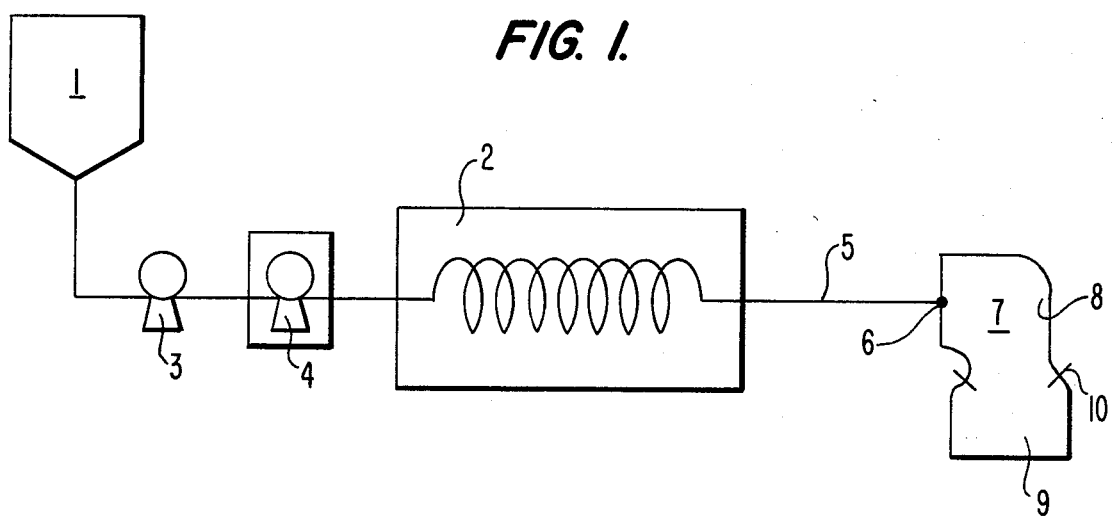
FIG. 1 is a schematic flow chart illustrating a preferred embodiment of the process of the present invention.

In the process of the present invention, a meat block-like protein material can be readily and continuously produced by preparing a slurry containing a raw protein material, heating the slurry under pressure to force the slurry flow through a flow path, and continuously releasing the flowing slurry from the downstream end of the flow path into a hollow piece connected to the flow path at one end of the hollow piece and having an inner surface extending across the releasing direction of the slurry and an outlet opening provided at the other end of the hollow piece. A fibrous protein material is formed from the slurry by flowing and releasing it through the flow path into the hollow piece and it accumulates and coagulates on the inner surface of the hollow piece to form a block or lump of the fibrous protein material. The block or lump thus formed spontaneously, and continuously or intermittently discharges from the hollow piece through the outlet opening thereof by action of the continuously releasing fibrous material and steam or vapor produced at the releasing of the slurry to give the desired meat block-like protein material.

Examples of the raw protein material to be used for the preparation of the slurry in the present invention are proteins obtained from oilseeds such as soybeans, cotton seeds, peanuts and the like. Their combinations with a minor amount of one or more other proteins such as vegetable proteins (e.g. wheat protein, leaf protein, etc.), animal proteins (e.g. milk protein, meat protein, fish meat protein, etc.) and microbial proteins can be also used. The raw protein material can be used in an amount of 2.5 to 35% (as dry solid) by weight based on the total weight of the slurry.

In addition to the raw protein material, other materials such as cereal flours (e.g. wheat flour, rice flour, etc.), starches (e.g. wheat starch, corn starch, potato starch, sweet potato starch, starch derivatives or modified starches such as α-starch, dextrin, etc.), saccharides (e.g. monosaccharides, oligosaccharides, polysaccharides), oils and fats (e.g. animal and vegetable oils and fats, hardened or fractionated derivatives thereof, etc.), sodium compounds (e.g. NaCl, etc.), calcium compounds (e.g. $CaCl_2$, $Ca(OH)_2$, etc.), seasonings (e.g. beef extract, pork extract, etc.), coloring agents, flavors, and other suitable food additives can be added to the slurry. These other materials can be used alone or in combination thereof in an amount of not more than 50% by weight based on the total amount of the dry solid in the slurry. Particularly, when such materials as cereal flour and starch are added, the constant continuous production of the desired meat block-like protein material can be more readily attained. It is presumed that this effect of the constant production by addition of these materials is owing to that the slurry maintains a suitable viscosity enough to facilitate the accumulation of the fibrous protein material formed in the hollow piece and that slipperiness or movement of the fibrous protein material on the inner surface of the hollow piece is improved to facilitate discharge of the block or lump therefrom. In order to obtain this effect, it is preferable to add cereal flour and/or starch to the slurry in an amount of 2 to 30% by weight based on the total amount of the dry solid in the slurry. Further, the use of these materials and/or oils and fats are effective for making the resulting meat block-like protein material tender. Oils and fats can be used in an amount of 2 to 25% by weight, preferably, 5 to 15% by weight based on the total amount of the dry solid in the slurry. Furthermore, it is advantageous to add a seasoning to the slurry because it is readily and uniformly dispersed into the resulting meat block-like protein material in comparison with a conventional technique such as immersion thereof in a solution containing the seasoning. That is, although such a conventional technique can be applied to the resulting meat block-like protein material of the present invention, the protein material is thicker than a conventional fibrous protein and it is rather difficult to obtain the uniform dispersion of the seasoning in short time by immersion.

The slurry used in the present invention can be prepared by a conventional method such as mixing the raw protein material and, optionally the above other materials with water. In general, the water content of the slurry is 65 to 95% by weight, preferably, 65 to 76% by weight, more preferably, 68 to 73% by weight. When the water content exceeds 95% by weight, formation of the fibrous protein material becomes difficult. It is advantageous that the water content is 76% by weight or lower because separation and loss of liquid from the fibrous protein material can be prevented. As the result, yield can be increased and, from the environmental protection viewpoint, waste water can be minimized. Besides, toughness of the resulting meat block-like protein material can be adjusted by increase and decrease of the water content.

Preferably, pH of the slurry is, for example, 4 to 6 including the isoelectric point of the protein used. For example, in case of using soybean protein, the desired fibrous structure of the resulting meat block-like protein material can be readily obtained at pH 4 or higher but, when pH is higher than 6, it tends to be too tender and to decrease meat-like texture and mouth feel thereof. If necessary, pH of the slurry can be adjusted by using a suitable acid or alkali (e.g. HCl, NaOH, $Na_2CO_3$, etc.)

The slurry thus prepared is heated under pressure to force it to flow through a flow path. Any apparatus which can be used for heating the slurry under pressure and has a flow path for flowing the slurry can be used for this purpose. For example, an indirect heating apparatus such as a combination of a pressure pump and a coiled tubular heat exchanger, an ejector, Votator and the like can be used. Such pressure that it is sufficient for heating and flowing the slurry is applied. In general, the pressure of 10 to 600 $kg/cm^2$, preferably, 10 to 400 $kg/cm^2$, more preferably, 50 to 300 $kg/cm^2$ is sufficient for this purpose. The heating temperature is 105° C. to 170° C., preferably, 130° C. to 160° C. When the heating temperature is below 105° C., formation of the fibrous protein material from the flowing slurry becomes difficult and, when the heating temperature is higher than 170° C., the slurry is liable to be scorched. The heating time is inversely proportional to the heating temperature and can be controlled by adjusting the flow rate of the slurry. Usually, the flow rate is not less than 30 cm/sec as a fluid velocity.

Although the formation of a fibrous protein by heating a slurry containing raw protein material under pressure to force it to flow through a flow path has been already known in the prior art such as U.S. Pat. No. 4,197,327, the present invention is characterized by releasing the flowing slurry from the downstream end of the flow path into the hollow piece.

The flow path is generally a pipe or a tube having a diameter at the downstream end thereof sufficient for forming the fibrous protein material, for example, 2 to 10 mm. Or, an orifice or a constriction means is preferably provided at the downstream end of the flow path so that the releasing rate of the flowing slurry into the hollow piece can be controlled by adjusting the diameter of the orifice or the opening of the constriction means. Usually, the diameter of the orifice is 0.2 to 5 mm. The diameter of the downstream end of the flow path or the orifice is smaller, the releasing rate becomes higher. The orifice may have one or more openings and it may be a tip or nozzle.

The hollow piece is connected to the flow path at one end thereof and has an inner surface extending across the releasing direction of the flowing slurry and an outlet opening provided at the other end of the hollow piece. The cross sectional area of the hollow piece is greater than the diameter of the flow path and the outlet opening communicates with the atmosphere. The distance between the downstream end of the flow path and the inner surface can be appropriately adjusted. For this purpose, the flow path can be slidably connected to the hollow piece. In general, the cross sectional area of the hollow piece at the entrance thereof is 3 to 500 times, preferably, 5 to 250 times as great as that of the downstream end of the flow path, or 5 to 2,000 times, preferably, 9 to 1,000 times as great as that of the orifice. Further, in genreal, the distance between the downstream end of the flow path and the inner surface is 5 to 500 mm, particularly, 10 to 300 mm.

The shape of the hollow piece is not limited to a specific one and it may be a chamber or a pipe, the inside wall of which can be served for the inner surface for accumulation of the fibrous protein material. Unless the movement of the accumulated and coagulated material on the inner surface and discharge thereof from the outlet opening as described hereinafter is obstructed, the shape and the nature of the inner suface is not limited and it may be flat or curved. The angle between the releasing direction of the slurry and the inner surface can be controlled by adjusting the releasing direction of the slurry or selecting the shape of the hollow piece appropriately. For example, the angle can be controlled by adjusting the direction of the orifice and/or adjucting a slope of the inner surface. The angle becomes greater, a resulting product changes its shape from a block to a slice. When the angle is around 90°, a suitable block is formed. Further, the angle becomes smaller, a longer product is formed. Usually, the angle is between 10 and 160°. The shape and the size of the outlet opening is not limited to a specific one and a pivotable hinged lid or plate may be provided to the outlet opening.

When the flowing slurry is released from the downstream end of the flow path into the hollow piece, a fibrous protein material is formed owing to lowering of pressure accompanied by lowering of temperature. The fibrous protein material thus formed does not yet completely coagulate. When the fibrous material or a precursor thereof accumulates on the inner surface, bundling and confounding thereof occur and, upon completion of coagulation, a block or lump of the fibrous protein material is formed. It is presumed that this accumulation occurs because the fibrous protein material or the precursor thereof comes into collision with the inner surface to decrease the releasing rate thereof. If the inner surface is not present, the fibrous protein material discharges from the hollow piece without any accumulation.

The block or lump of the fibrous protein material thus formed moves on the inner surface toward the outlet opening by action of the subsequently and continuously releasing fibrous protein material and steam or vapor produced at the releasing of the slurry, and then spontaneously, and continuously or intermittently discharges from the outlet opening of the hollow piece. That is, under such conditions that the steam or vapor readily escapes from the hollow piece through spaces or gaps of the resulting accumulated product, the block or lump continuously discharges from the outlet opening. On the other hand, under such conditions that the released fibrous material has accumulated in the hollow piece and the steam or vapor hardly escapes from the hollow piece, the internal pressure of the hollow piece is temporarily increased to discharge the block or lump from the outlet opening and then the internal pressure is decreased. When this is repeated, the block or lump intermittently discharges from the outlet opening. Unless the block or lump sticks on the inner surface, the mode of discharge is of no importance. Although, usually, control of the temperature of the hollow piece is not needed, if necessary, the hollow piece may be heated or cooled depending upon the length and the cross sectional area of the hollow piece, atmospheric temperature and the nature of the slurry.

Optionally, the discharged material is cut in a desired size. The discharged material contracts with cooling to form the desired meat block-like protein material of the present invention being rich in a fibrous structure and having dense, meat-like texture and mouth feel. In general, pH of the resulting meat block-like protein material is 4 to 6 and, if necessary, pH of the meat block-like protein material can be adjusted to such a desired pH range as 3 to 7 to by immersing it in a solution of an acid or alkali (e.g. HCl, NaOH, $Na_2CO_3$, etc.) or by spraying such a solution of acid or alkali near the outlet opening of the hollow piece after coagulation thereof.

The meat block-like protein can be fried and seasoned in various use, for example in using it as foodstuffs as well as raw materials of other foodstuffs, and also be sticked or pressed one another to be a larger block or lump using such binding agent as heat-coagulable protein such as poultry, cattle or fish meat, soybean protein and the like.

Referring now to the drawings, a preferred embodiment of the process of the present invention is illustrated.

FIG. 1 shows a schematic flow chart of a preferred embodiment of the process of the present invention. The slurry containing the raw protein material is prepared in a slurry tank 1 and the slurry is fed to a coiled tubular heat exchanger 2 through a feed pump 3 and a pressure pump 4 to heat the slurry under pressure in the heat exchanger 2. Then, the slurry is forced to flow through a flow path 5 and continuously released from the orifice 6 provided at the downstream end of the flow path 5 into a hollow piece 7. In the hollow piece 7, a fibrous protein material is formed from the releasing slurry and it accumulates and coagulates on an inner surface 8 of the hollow piece to form a block or lump of the fibrous protein material. The block or lump thus formed spontaneously discharges from the hollow piece 7 through an outlet opening 9 of the hollow piece to give the desired meat block-like protein material. Nozzles 10 are provided at both sides of the outlet opening 9 for spraying a solution of an acid or an alkali to adjust pH of the resulting meat block-like protein material.

FIGS. 2 to 11 show schematic perspective views of various types of the hollow piece 7 used in the process of the present invention.

Figure 2:
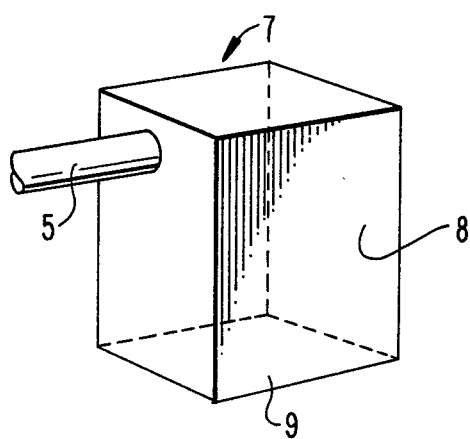
FIG. 2 is a schematic perspective view illustrating one embodiment of the hollow piece used in the process of the present invention.
Figure 3:
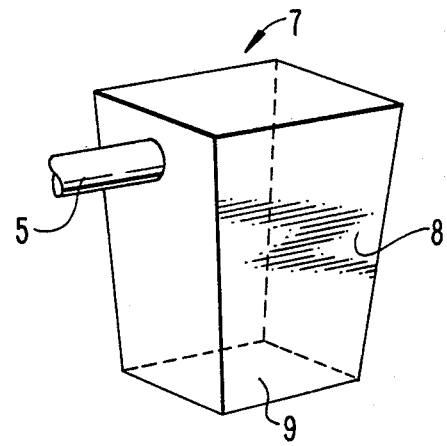
FIGS. 3 to 11 are schematic perspective views illustrating other types of the hollow piece used in the process of the present invention.
Figure 4:
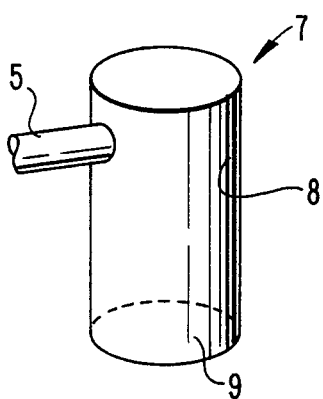

The hollow piece 7 shown in FIG. 2 is a box-like chamber ($11 \times 11 \times 50$ mm) and the flow path 5 is connected and inserted into the chamber through a side wall of the chamber. The inside of another side wall faced to the side wall through which the flow path 5 is inserted provides the inner surface 8 for accumulation of the fibrous protein material. The chamber has no bottom wall and is opened to the atmosphere to provide an outlet opening 9. The shape of the chamber is not limited to the rectangular chamber as shown in FIG. 2 and it may be a polygonal, trapezoid, inverted trapezoid, frusto-pyramidal, inverted frusto-pyramidal, cylindrical, frusto-conical or inverted frusto-conical chamber. FIG. 3 shows the hollow piece 7 in the shape of an inverted trapezoid chamber. Likewise, this chamber has no bottom wall to provide an outlet opening 9. By appropriately selecting the slope of the side wall against the top wall, the angle between the releasing direction of the slurry and the inner surface 8 can be controlled. FIG. 4 shows the hollow piece 7 in the shape of a cylindrical chamber in which the inside of the side wall faced to the flow path 5 provides the inner surface 8 and the chamber has no bottom wall to provide an outlet opening 9.

Figure 5:
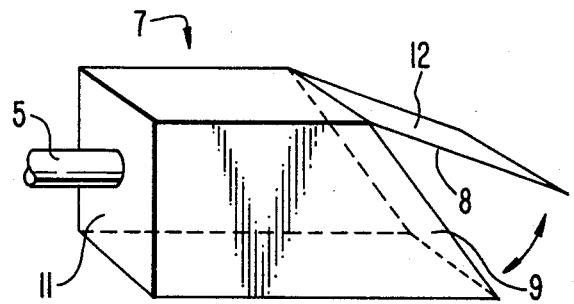
Figure 6:
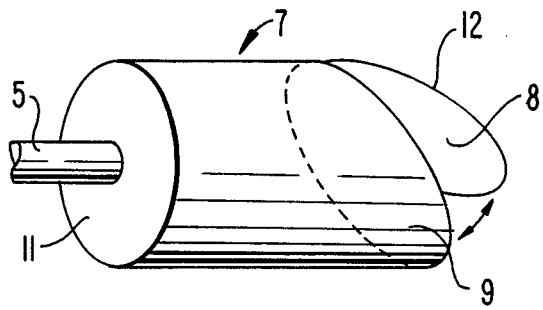

FIG. 5 shows another type of the hollow piece 7. This hollow piece is a pipe having square cross section and one end of the pipe is closed by a wall 11 through which the flow path 5 is inserted. The other end of the pipe is obliquely cut off and opened to the atmosphere to provide an outlet opening 9. A lid 12 pivotably hinged to the top wall of the pipe is provided to the opening. The inside of the lid 12 serves as the inner surface 8 for accumulation of the fibrous protein material. By appropitately selecting the slope of the lid against the top wall, the angle between the releasing direction of the slurry and the inner surface 8 can be controlled. When the fibrous protein material has accumulated and the internal pressure becomes higher, the lid is pivotably opened and the accumulated product discharges. The shape of the cross section of the pipe is not limited to square and it may be round or elliptical. FIG. 6 shows a similar hollow piece 7 having round cross section.

Figure 7:
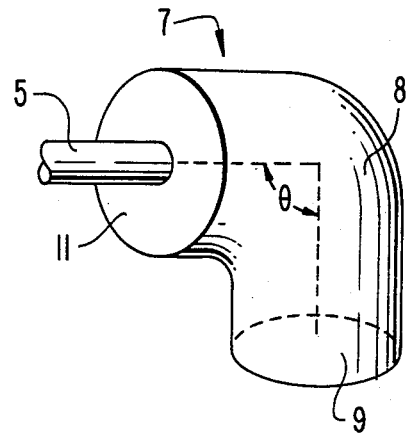
Figure 8:
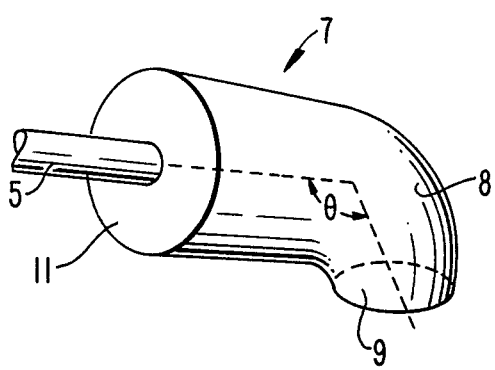
Figure 9:
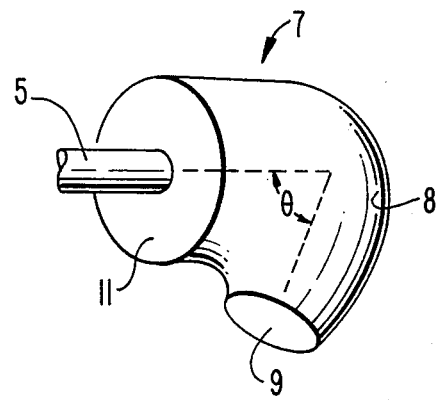
Figure 10:
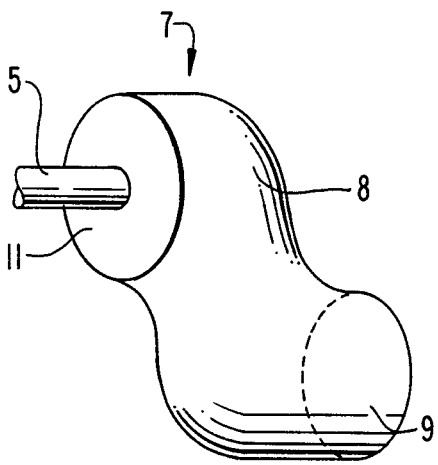
Figure 11:
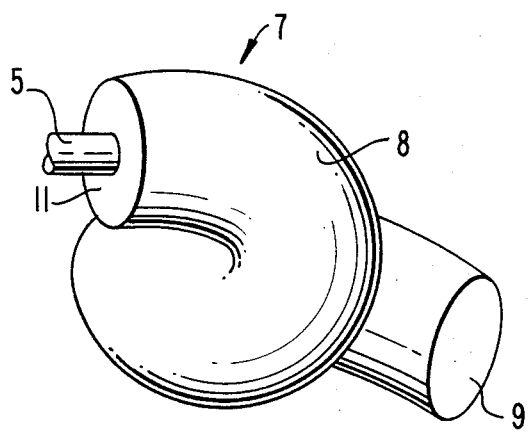

FIG. 7 shows still another type of the hollow piece 7. This hollow piece has an elbow-like shape and one end thereof is closed by a wall 11 through which the flow path 5 is inserted. The inside of the curved part faced to the flow path 5 provides the inner surface 8 for accumulation of the fibrous protein material. The other end is opened to the atmosphere to provide an outlet opening 9 (entrance diameter: 40 mm, outlet diameter: 25 mm). In the hollow piece 7 of FIG. 7, the flow path 5 is inserted at the center of the wall 11 and the angle $\theta$ between the releasing direction of the slurry and the inner surface 8 is about 90°. If the flow path 5 is eccentrically inserted through the wall 11, the angle can be changed owing to the bend of the piece. In this case, the wall 11 can be attached to the side wall of the piece in such a manner that the wall or the piece itself can rotate around the horizontal center axis of the wall to adjust the angle by rotation of the wall or the piece itself. FIGS. 8 and 9 show the modifications of the piece shown in FIG. 7 and the angles θ between the releasing direction of the slurry and the inner surface 8 thereof are about 110° and 60°, respectively. FIG. 10 shows the piece in the shape of a S-shaped pipe and FIG. 11 shows the piece in the shape of a spiral pipe. These outlet openings can be directed toward any direction, e.g. upward, downward, sideways, etc.

As described hereinbefore, according to the present invention, the meat block-like protein material can be readily and continuously produced from a raw protein material only by releasing a slurry containing it into the hollow piece.

The following examples further illustrate the present invention in detail but are not to be construed to limit the scope thereof. In the examples, all "parts" are by weight unless otherwise stated.

EXAMPLE 1

Water (10-fold by volume) was added to low denaturated, defatted soybean flour and soybean protein was extracted. The residue was removed from the extract and 12 N hydrochloric acid was added to the extract until pH reaches to 4.5 to form a curd. The curd was washed once with water and dehydrated to obtain an acid precipitated curd having a solid content of 30% (protein content: 92% of the solid).

The acid precipitated curd (100 parts as the solid), palm oil (15 parts) and beef extract (4 parts) were mixed. The pH of the mixture was adjusted to 4.8 with 4N sodium hydroxide and the water content thereof was adjusted to 72% with tap water to obtain a slurry containing protein.

The slurry was fed to a coiled tubular heat exchanger (inner diameter of tube: 4 mm, tube length: 24 m) through a feed pump and a pressure pump at a fluid velocity of 1 m/sec as shown in FIG. 1 and heated at 155° C. under a pressure of 50 kg/cm². The slurry was forced to flow through a flow path having an inner diameter of 4 mm and a length of 1 m and released from the downstream end of the flow path through an orifice having one opening (inner diameter: 0.5 mm) into a hollow piece as shown in FIG. 4 (distance between the orifice and the inner surface: 11 mm, angle between the releasing direction and the inner surface: 90°). From the outlet opening of the piece, the desired meat block-like protein material stick having an average thickness (diameter) of 10 mm continuously discharged. The meat block-like protein material thus obtained was rich in a fibrous structure and had a dense, meat-like texture and meat-like mouth feel.

EXAMPLE 2

The acid precipitated curd prepared as in Example 1 (80 parts as the solid), α-starch (10 parts), dextrin (10 parts), soybean oil (15 parts), beef extract (4 parts) and calcium chloride (1 part) were mixed. The pH of the mixture was adjusted to 4.8 with 4N sodium hydroxide and the water content thereof was adjusted to 72% with tap water to obtain a slurry containing protein.

According to the same manner as in Example 1, the several runs were carried out by using various types of pieces as shown in the drawings to obtain the desired meat block-like protein material from the slurry. The process conditions are shown in Table 1. The conditions for heating under pressure were the same as those in Example 1.

TABLE 1

| Run No. | 1 | 2 | 3 | 4 | 5 |
|---|---|---|---|---|---|
| Inner diameter of flow path (mm) | 4 | 4 | 4 | 6 | 6 |
| Inner diameter of orifice (mm) | 0.5 | 1.3 | 1.3 | 3 | 3.5 |
| Piece | FIG. 4 | FIG. 4 | FIG. 8 | FIG. 7 | FIG. 9 |
| Size of entrance of piece (mm) | 11∅ | 40∅ | 40∅ | 40∅ | 40∅ |
| Angle between releasing direction and inner surface (°) | 90 | 86 | 110 | 90 | 60 |
| Distance between orifice and inner surface (mm) | 11 | 40 | 80 | 70 | 70 |
| Max. side wall length of piece (mm) | 50 | 110 | 135 | 135 | 135 |
| Min. side wall length of piece (mm) | 50 | 110 | 70 | 70 | 40 |
| Size of outlet opening of piece (mm) | 11∅ | 25∅ | 25∅ | 25∅ | 25∅ |

The characteristics of the resulting products of each run are as follows:

Run No. 1: A protein material stick having an average thickness of 10 mm was continuously obtained. The product had a dense texture and cattle meat-like mouth feel. The product was cut in an average length of 100 mm to obtain the desired meat block-like protein material.

Run No. 2: A protein material stick having an average diameter of 20 mm was continuously obtained, The product had a dense texture and cattle meat-like mouth feel. The product was cut in an average length of 100 mm to obtain the desired meat block-like protein material.

Run No. 3: A protein material block having an average thickness of 5 to 10 mm, an average width of 20 mm and an average length of 50 to 100 mm was intermittently obtained. The texture was somewhat rough and the product had cattle meat-like mouth feel.

Run No. 4: A protein material block having an average diameter of 20mm and an average length of 100 mm was intermittently obtained. The texture was dense and tender and the product had cattle meat-like mouth feel.

Run No. 5: A protein material block having an average diameter of 20 mm and an average length of 50 to 100 mm was intermittently obtained. The texture was dense and the product had cattle meat-like mouth feel.

As the result, it seems that, when the piece in the shape of an elbow the outlet opening of which is somewhat narrow is used, the resulting meat block-like protein material has more improved cattle meat-like texture and mouth feel.

Example 3

In order to observe the effect of the addition of starch to the slurry, various slurries were prepared according to the formulations as shown in Table 2. The acid precipitated curd was prepared according to the same manner as in Example 1. The ingredients were mixed and the pH of the mixture was adjusted to 4.8 with 4N hydrochloric acid and 4N sodium hydroxide. The water content of the mixture was adjusted with tap water.

TABLE 2

| Ingredients | Slurry No. | | | | | |
|---|---|---|---|---|---|---|
| | 1 | 2 | 3 | 4 | 5 | 6 |
| Acid precipitation cured (solid parts) | 100 | 96 | 90 | 80 | 80 | 70 |
| α-Starch (parts) | — | 4 | 10 | 10 | 10 | 10 |
| Low gluten wheat flour (parts) | — | — | — | — | — | 10 |
| Dextrin (parts) | — | — | — | — | 10 | 10 |
| Glucose (parts) | — | — | — | 10 | — | — |
| Palm oil (parts) | 15 | 15 | 15 | 15 | 15 | 15 |
| Beef extract (parts) | 4 | 4 | 4 | 4 | 4 | 4 |
| NaCl (parts) | 1 | — | 1 | — | 1 | — |
| CaCl$_2$ (parts) | 1 | 1 | — | — | — | 1 |
| Water content (%) | 72 | 72 | 72 | 72 | 72 | 75 |

According to the same manner as Run No. 4 in Example 2, a protein material was produced by using each slurry thus prepared. The characteristics of the resulting products are as follows:

Slurry No. 1: A particulate product having an average particle size of 5 mm was obtained. The texture was dense and the mouth feel was more tough than that of Slurry No. 2.

Slurry No. 2: A product having a thick fibrous structure of 5 mm in average thickness was continuously obtained. The product had a dense texture and cattle meat-like mouth feel.

Slurry No. 3: A protein material block having an average width of 15 mm and an average thickness of 7 mm was continuously produced. The product had cattle meat-like texture and mouth feel.

Slurry No. 4: A protein material block having an average width of 20 mm, an average thickness of 10 mm and a length of 50 to 100 mm was intermittently obtained. The product had cattle meat-like texture and mouth feel.

Slurry No. 5: A protein material block having an average width of 20 mm, a thickness of 5 to 10 mm and a length of 50 to 100 mm was intermittently obtained. The texture was somewhat rough and the product had cattle meat-like mouth feel.

Slurry No. 6: A protein material block having an average thickness of 20 mm and a length of 50 to 100 mm was intermittently obtained. The product was more tender than that of Slurry No. 5 and had cattle meat-like texture and mouth feel.

As the result, it seems that, when the amount of starch is increased, the size of the resulting product becomes larger and the texture and mouth feel become more tender.

EXAMPLE 4

According to the same manner as in Example 2, a slurry was prepared. By using this slurry, several runs were carried out to obtain the meat block-like protein material. The process conditions were the same as those of Run No. 4 in Example 2 but the releasing the slurry was varied as follows:

Run No. 6: An orifice having one opening (diameter: 1.3 mm) was used.

Run No. 7: Any orifice was not attached to the flow path (inner diameter: 4 mm).

Run No. 8: An orifice having four openings (each diameter: 0.5 mm) was used.

The characteristics of the resulting products are as follows:

Run No. 6: A protein material block having an average width of 20 mm, an average thickness of 10 mm and a length of 50 to 100 mm was intermittently obtained. The product had cattle meat-like texture and mouth feel.

Run No. 7: A protein material block having the same size as that of Run No. 6 was obtained. The fibrous structure and texture were somewhat faint in comparison with those of Run No. 6 but the product had cattle meat-like texture and mouth feel.

Run No. 8: A protein material block having the same size as that of Run No. 6. The product had the same cattle meat-like texture and mouth feel as those of Run No. 6.

The products of Run Nos. 6 and 8 were more tough than that of Run No. 7.

EXAMPLE 5

A acid precipitated curd prepared by the same manner as in Example 1 (61.4 parts as solid), α-starch (7.7 parts), dextrin (7.7 parts), palm oil (11.5 parts), beef extract (10 parts), coloring agent (cocoa color, 0.9 part) and salt (0.8 part) were mixed. The pH of the mixture was adjusted to 4.8 with 4N sodium hydroxide and the water content of the mixture was adjusted to 72% with tap water to obtain a slurry. This slurry was fed to a coiled tubular heat exchanger (inner diameter of tube: 8 mm, tube length: 40 m) through a feed pump and a pressure pump as shown in FIG. 1 to heat the slurry at 150° C. at 150 kg/cm$^2$. The slurry was forced to flow through a flow path (inner diameter: 8 mm) and released through an orifice having one opening (diameter: 3 mm) into a hollow piece shown in FIG. 7. 3% Aqueous solution of sodium carbonate was sprayed through the nozzles provided at both sides of the outlet opening of the piece as shown in FIG. 1 to the product discharging therefrom in such a rate that the sodium carbonate content in the product being 7% to adjust the pH thereof to 5.5. Thus, the meat block-like protein material having a thickness of 5 to 10 mm, a width of 25 to 30 mm and a length of 80 to 200 mm was intermittently obtained.

EXAMPLE 6

An acid precipitated curd prepared by the same manner as in Example 1 (61.4 parts as solid), α-starch (7.7 parts), dextrin (7.7 parts), palm oil (11.5 parts), beef extract (10 parts), coloring agent (cocoa color, 0.9 part) and salt (0.8 part) were mixed. The pH of the mixture was adjusted to 4.8 with 4N sodium hydroxide and the water content of the mixture was adjusted to 72% with tap water to obtain a slurry. This slurry was fed to a coiled tubular heat exchanger (inner diameter of tube: 4 mm, tube length 40 m) through a feed pump and a pressure pump as shown in FIG. 1 to heat the slurry at 150° C. at 150 kg/cm$^2$. The slurry was forced to flow through a flow path (inner diameter: 4 mm) and released through an orifice having 15 openings (each diameter: 0.5 mm) into a hallow piece (size of entrance of the piece: 60 mmφ, angle between releasing direction and inner surface: 90° C., distance between orifice and inner surface: 200 mm, size of outlet opening of piece: 45 mmφ) shown in the same type as in FIG. 7. Thus, the meat block-like protein material having an average thickness of 30 to 40 mm, an average width of 50 to 60 mm, and an average length of 80 to 100 mm was intermittently obtained. The product had cattle meat like texture and mouth feel.

EXAMPLE 7

According to the same manner as in Example 6, a slurry was prepared. But, the run was carried out without the orifice attached to the flow path as in Example 6. Other process conditions were the same as those of Example 6. The meat block-like protein material having an average thickness of 30 to 40 mm, an average width of 50 to 60 mm, and an average length of 80 to 100 mm was intermittently obtained.

The product was rather tender than that of Example 6 but had cattle meat-like texture and mouth feel.

What is claimed is:

1. A process for producing a meat block-like protein material which comprises preparing a slurry containing a raw protein material, heating the slurry under pressure to force the slurry to flow through a flow path, and continuously releasing the flowing slurry from the downstream end of the flow path into a hollow piece connected to the flow path and having an inner surface extending across the releasing direction of the slurry and an outlet opening communicating with the atmosphere provided in the hollow piece thereby forming a fibrous protein material and allowing the fibrous material to accumulate and coagulate on the inner surface to form a block or lump of the fibrous protein material so that it continuously or intermittently discharges from the hollow piece through its outlet opening to give the meat block-like protein material.

2. A process according to claim 1, wherein the slurry contains the raw protein material in an amount of 2.5 to 35% by weight (as solid) based on the total weight of the slurry and the water content thereof is 65 to 95% by weight.

3. A process according to claim 2, wherein the slurry contains starch and/or cereal flour in an amount of 2 to 30% by weight based on the total weight of the dry solid in the slurry.

4. A process according to claim 2, wherein the slurry contains a fat or oil in an amount of 2 to 25% by weight based on the total weight of the dry solid in the slurry.

5. A process according to claim 2, wherein the pH of the slurry is 4 to 6.

6. A process according to claim 1, wherein the slurry is heated to 105° to 170° C. under a pressure of 10 to 600 kg/cm$^2$.

7. A process according to claim 1, wherein the cross sectional area of the hollow piece at the entrance thereof is 3 to 500 times as great as that of the flow path.

8. A process according to claim 1, wherein an orifice is provided at the downstream end of the flow path.

9. A process according to claim 8, wherein the cross sectional area of the hollow piece at the entrance thereof is 5 to 2,000 times as great as that of the orifice.

10. A process according to claim 1, wherein the distance between the downstream end of the flow path and the inner surface is 5 to 500 mm.

* * * * *